June 7, 1949. W. VON STOESER 2,472,389
FLOAT CONTROL FOR LIQUID DISPENSING DEVICES
Filed Sept. 17, 1943
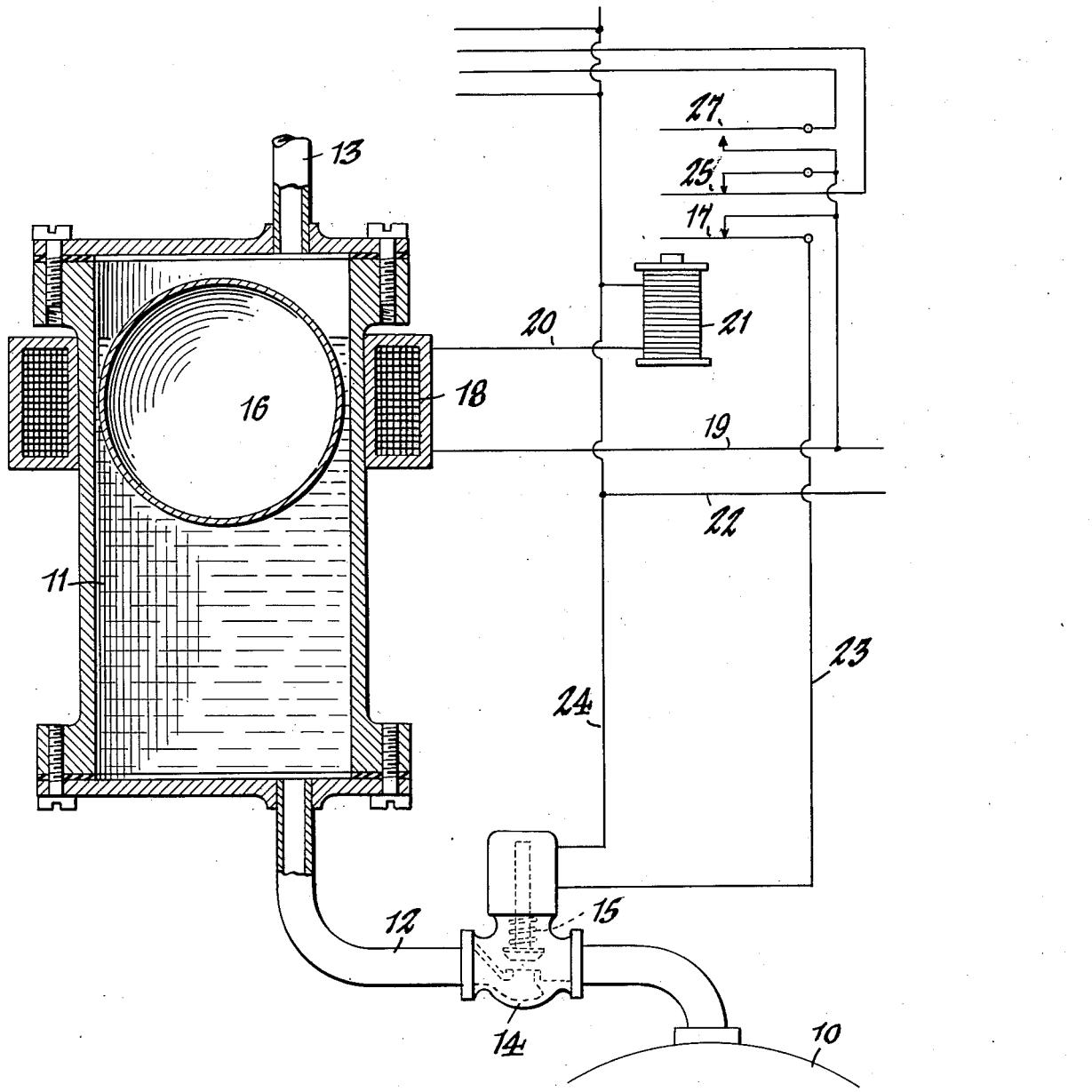
Inventor,
Walter Von Stoeser,
by Walter P. Geyer
Attorney.

UNITED STATES PATENT OFFICE 2,472,389

FLOAT CONTROL FOR LIQUID DISPENSING DEVICES

Walter Von Stoeser, North Tonawanda, N. Y., assignor to The Rudolph Wurlitzer Company, North Tonawanda, N. Y., a corporation of Ohio Application September 17, 1943, Serial No. 502,772

1 Claim. (Cl. 222—67)

This invention relates to certain new and useful improvements in liquid level control devices.

It has for one of its objects to provide a simple and effective device of this character which is designed for use with fluid supply tanks or reservoirs to permit the normal flow of fluid from such reservoir until such time as it reaches a predetermined level, when the flow of fluid is automatically shut off and suitable signals and other instrumentalities rendered operative or inoperative to indicate an empty or substantially empty condition of the reservoir.

Another object of the invention is to provide a liquid level control device embodying a combination float and electrically controlled means so designed as to automatically maintain the reservoir valve in its open or operative position as long as there is liquid in the reservoir and to effect the closing of such valve when the liquid assumes a predetermined level or the reservoir is empty.

Other features of the invention reside in the construction and arrangement of parts hereinafter described and particularly pointed out in the appended claim.

The accompanying drawing is a combined sectional elevation and diagrammatic view of the liquid level control embodying my invention.

This invention has been primarily designed for use with liquid supply tanks or reservoirs, and by way of example has been shown in connection with a beverage tank 10 constituting part of a coin-controlled beverage dispensing apparatus which acts to dispense a predetermined quantity of the beverage upon the deposit of a coin. The present device is interposed between the supply tank and the dispensing unit of the apparatus and serves to maintain the apparatus operative until such time as the liquid in the device falls below a predetermined level, at which time the supply of liquid from the supply tank is cut off and the apparatus otherwise rendered inoperative.

By preference, this liquid level control device consists of a combined beverage-dispensing and float chamber 11 which is connected at its lower end by an inlet pipe 12 with the supply tank 10, while its upper end has an outlet pipe 13 leading to the dispensing unit of the dispensing apparatus or the like. Interposed in the inlet pipe is a valve 14 for controlling the flow of liquid from the supply tank to the float chamber, which valve is of the solenoid-operated type having a spring 15 for normally urging the valve to a closed position. When the solenoid element of the valve is energized, then the same is adapted to open.

Operating in the float chamber 11 is a float 16 which is in the form of a hollow ball and free of connections of any kind to rise and fall in the chamber in response to the change in the level of liquid therein. Surrounding the upper portion of this chamber is an electric field creating means which functions, depending upon the location of the float with reference to such means, to govern the opening and closing of a switch 17 for controlling the solenoid-actuated valve 14, whereby when the float is in its elevated position it influences the field-creating means to maintain the switch closed and the valve 14 open and when the float is in its lowered position it influences the field-creating means to cause the switch to open and the liquid control valve to close. This field-creating means is preferably in the form of a solenoid-like coil 18 having one end thereof connected to a feed wire 19 and its other end connected by a wire 20 in series with a relay coil 21, the other end of such coil being connected to the companion feed wire 22. Associated with and constituting the armature of this relay coil is the movable element of the switch 17 which is connected by a wire 23 with one terminal of the solenoid of the valve 14, while the companion terminal thereof is connected by a wire 24 leading to the supply wire 22. The float 16 constitutes the magnetic core element of the solenoid-like coil 18 and when the float is in its elevated position, due to the normal flow of liquid from the supply tank, it serves to increase the density of the magnetic field which in turn increases the reactance or counter-voltage characteristic of the coil, resulting in a reduced voltage flow which is insufficient to energize the relay coil 21. Because of this fact, the switch 17 assumes its normally closed position to close the circuit including the solenoid valve 14 and maintain the latter in its open position during the time that the float is in its upper position within the plane of the field-creating coil 18. When the float drops in its chamber out of the influencing zone of the coil, as when the supply tank 10 becomes empty, then an air core is established in the magnetic field of the coil which decreases the density of the field and allows the circuit to become normally operative. This condition results in the energizing of the relay coil 21 to cause its armature or movable element of the switch 17 to be attracted to it and open such switch, thereby deenergizing the solenoid of the liquid-control valve 14 and causing the latter to close.

If desired, the opening and closing of the circuit of the control valve 14 may also serve to open or close other circuits for governing the dispensing apparatus with which the liquid control device is associated. For example, a switch 25 may be provided which opens and closes simultaneously with the valve control switch 17 for governing, say, the coin-control mechanism of the dispensing apparatus, whereby said switch is closed when the normal flow of liquid is present and opened when the supply tank is empty, so that the dispensing apparatus is automatically rendered inoperative. Furthermore, a third switch 27 may be provided for controlling a visual signal or the like to indicate that the supply tank is empty. This switch, when normal flow of liquid is present, remains open to extinguish the signal and is adapted to close to render the signal operative when the switches 17, 25 are open.

I claim as my invention:

A liquid level control device for use with a beverage dispensing apparatus including a coin control switch and a beverage supply tank, comprising a combined dispensing and float chamber having an inlet adapted for communication with said supply tank and an outlet for the beverage to be dispensed, a normally-closed, electrically-governed valve interposed between said tank and said chamber, a float operating in said chamber and free of any connection therewith, an electric circuit including said valve and a control switch therefor and said coin-control switch, and means in said circuit for simultaneously governing said switches including a magnetic field creating coil about said chamber for subjective influence by the float as determined by its position and a relay coil in operative relation to such switches, whereby the circuit is rendered operative to close said switches to maintain the valve open and the dispensing apparatus operative when the float is in its elevated position and the circuit rendered otherwise operative to simultaneously open said switches and cause said valve to close and the coin switch to open to render the dispensing apparatus inoperative when the float is lowered in its chamber.

WALTER VON STOESER.

REFERENCES CITED

The following references are of record in the file of this patent:

UNITED STATES PATENTS

| Number | Name | Date |
|---|---|---|
| 347,589 | Ghegan | Aug. 17, 1886 |
| 781,828 | Janson | Feb. 7, 1905 |
| 1,906,702 | McCabe | May 2, 1933 |
| 2,006,135 | Gibbs | June 25, 1935 |
| 2,120,048 | Turner | June 7, 1938 |
| 2,243,188 | Brach | May 27, 1941 |

FOREIGN PATENTS

| Number | Country | Date |
|---|---|---|
| 499,219 | Great Britain | Jan. 20, 1939 |